PHASE MODULATION READ BACK CIRCUIT

Filed May 1, 1964

INVENTORS
EUGENE B. BARCARO
JOHN W. THOMPSON

BY *Edward M. Farrell*

ATTORNEY

United States Patent Office 3,387,292
Patented June 4, 1968

3,387,292
PHASE MODULATION READ BACK CIRCUIT
Eugene B. Barcaro, Norristown, and John W. Thompson, Upper Darby, Pa., assignors to Sperry Rand Corporation, New York, N.Y., a corporation of Delaware
Filed May 1, 1964, Ser. No. 364,122
5 Claims. (Cl. 340—174.1)

ABSTRACT OF THE DISCLOSURE

The present circuit enriches the third harmonic of one half of the frequency of the applied signal and provides a filter circuit tuned to said third harmonic. Accordingly, the output signal has the third harmonic of one half of the frequency of the applied signal accentuated and this technique minimizes distortion of a signal read back from a data recording medium, such as a tape, drum or the like.

Figure 1:
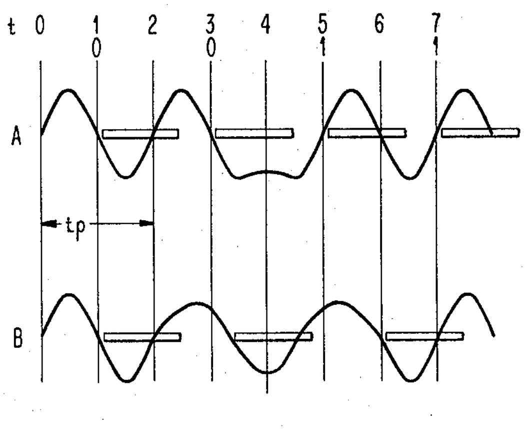

This invention relates to a read back circuit, and more particularly to a read back circuit for compensating for distortions on the signals read back from a recording medium.

In many computer systems, binary information signals are recorded on a recording medium, such as a magnetic drum or tape. Such binary signals, having one of two different characteristics, may represent a "1" or a "0" bit of information. A signal representing a "1," for example, in a phase modulation system, may be represented by an alternating signal having a first form for the first half of its digit period and a second form for the second half of its digit period. Likewise, a "0" may be represented by a signal which is in the second form for its first half of its digit period and the first form for the second half of its digit period. Both types of signals may be considered as passing through zero in going from one level to another at the middle of their digit periods.

It is this so called zero crossing point which is utilized in many phase modulation systems to produce pulse signals representing a "1" or a "0." By detecting the direction in which the binary signal is going at the zero crossing point, the nature of the signal, i.e. whether it is a "1" or a "0," may be determined.

One of the chief advantages which may be derived from a phase modulation system which uses zero crossover points to determine the nature of the information signal is that recorded sprocket or clock signals are not necessary to recover the information signals. So called "self sprocketing" systems are therefore feasible in phase modulation systems. These are systems in which the information signals are used to generate the sprocket signals, which may also be referred to as timing signals.

In a phase modulation system of the type mentioned, the original signals recorded on the recording medium generally pass through various stages during a reading operation to convert the recorded information into pulses which represent either a "1" or a "0." In passing through these various stages, so called "non-significant" pulse signals are produced. Non-significant pulse signals may be produced whenever the pattern of signals include two consecutive similar type information signals, for example, two consecutive "0's" or two consecutive "1's". Under these conditions, the information signals paso though zero at points of time other than the middle of the digit periods, in addition to passing through at the middle of the digit periods. These points of time are generally the beginning of the digit periods.

Since only the zero crossover points at the middle of the digit periods are used to recover true information signals, other generated signals or pulses which have the same characteristics as information signals are considered non-significant or spurious signals and must be eliminated before the information is applied to subsequent circuits.

In the past, circuit means have been employed to produce signals for a duration of these quarters of a digit period. These three quarter digit period signals were generally started by a true information pulse and used to inhibit the passage of spurious pulses to an output circuit.

In order to assure that the circuit may be triggered by a true information pulse, rather than a spurious pulse, it is necessary to provide a start-up pattern of signals which does not include any spurious signals. Such a pattern may be 1010 or some other pattern not including spurious or non-significant signals.

A fixed three quarter delay flop circuit is normally used to produce an inhibit sigial which iohibits the passage of non-significant or spurious signals while still permitting the passage of true information signals. As long as there are no variations in the digit period times, there is nothing wrong with the system involving a fixed three quarter delay flop signal.

However, if two consecutive bits of information (not spurious bits) occur within the same three quarter digit period, the fixed three quarter delay flop will inhibit the passage of true information thereby introducing an error into the system. Such an occurrence of two bits of information within the same three quarter digit period could result from jitter in the system, variations in the speed of the recording medium or degradations of the read out signals or from other causes.

When a pulsed phase modulation recording scheme is used for recording and recovering digital information, the readback signal generally undergoes varying degrees of degradation dependent upon the different parameters involved which may involve the recording current and pulse width, bit density, recording media, write-read head and read amplifier characteristics.

Degradation manifests itself in the phase shift of the zero crossings of the readback signal which can lead to the recovery of improper information. For example, if tape is the recording medium and the tape speed and pulse packing density are increased beyond a certain point, phase shift degradation becomes an important factor since the time between significant and non-significant zero crossings diminishes. The probing time lost by phase shifts then becomes an appreciable percentage of the total time available.

It is an object of this invention to provide improved means for assuming proper placement of read back information signals in a recording system.

It is an object of this invention to provide a circuit for compensating for degradations in a read out signal in a recording system.

In accordance with the present invention, a circuit for correcting degradations in signals read back from a recording medium is provided. The signals are first applied to a limiter. The limited signals are then applied to frequency selective filter network. The output signals from the filter network are then fed back and combined with the original read back signals to compensate for degradations in the signals.

Figures 2, 3:
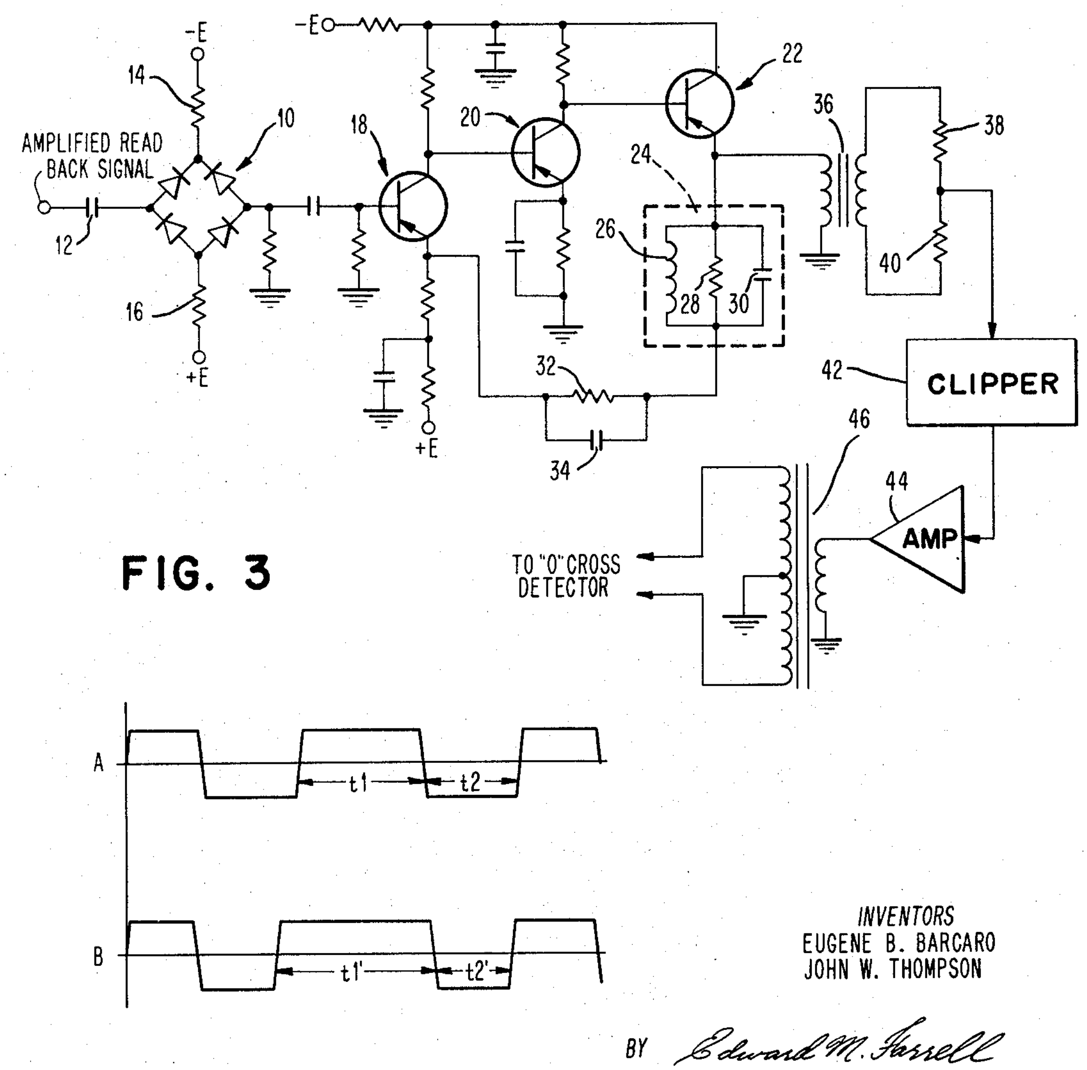

Other objects and advantages of the present invention will be apparent and suggest themselves to those skilled in the art from a reading of the following specification and claims, in conjunction with the accompanying drawing, in which:

FIGURES 1A and 1B illustrate various waveforms read back in a phase modulation system, FIGURE 2 is a schematic diagram illustrating one embodiment of the present invention for correcting degradations in a readback signal, and FIGURE 3 shows waveforms illustrating the operation of the present invention.

Referring particularly to FIGURE 1A, there is illustrated an idealized read back waveform, with the significant zero crossing occurring at precisely the right time intervals. The waveform illustrates a type of signal which may be read from a recording medium in a phase modulation recording system. A series of information signals "0011" is illustrated. The "0's" are denoted as significant zero crossings in the negative direction and the "1's" are denoted as significant zero crossings in the positive direction.

The blocked areas represent the time occupied by inhibiting pulses. These inhibiting pulses are generally generated shortly after each significant crossing. In many systems, the information pulses are used to start the inhibiting signals which may last three quarters of a digit period. The inhibiting pulses are used to block out the non-significant crossovers which would tend to be generated in a phase modulation read out system. For example, whenever two consecutive signals are of the same characteristics, non-significant zero crossings occur. The signal generated by these non-significant zero crossings must be eliminated.

In FIGURE 1, various time periods are indicated. Time periods $t_1$, $t_3$, $t_5$ and $t_7$ represent the time of the significant zero cross over points, that is, the time in which information signals normally are generated. Time periods designated as $t_2$, $t_4$ and $t_6$ represent time periods at which the non-significant zero cross over points would normally occur. It is noted that in the example given that non-significant zero cross over points occur at $t_2$ and $t_6$ which are between two consecutive information signals having the same characteristic. It is noted that no non-significant zero cross over occurs at $t_4$ which is between two information signals of different characteristics.

FIGURE 1B represents a waveform similar to that of FIGURE 1A except that the signal waveform is highly degraded. Because the signal is degraded, the zero cross over points no longer occur at the proper time intervals. Normally a significant cross over should occur at time $t_3$. However, the zero cross over point which should have occurred at time $t_3$ was delayed. Also, significant crossing at $t_5$ comes early. Consequently, the inhibiting signal, normally generated by information signals, is also delayed. It is seen in FIGURE 1B that the inhibiting signal extends into the time periods between $t_4$ and $t_5$ and tends to inhibit or block out a zero crossing at $t_5$ which is really a significant crossing. Because of this, the next non-significant crossing at $t_6$ is taken as being significant, causing the signals being read out to be in error.

It is seen that if the information recorded was meant to be "0011" and that if the signal is degraded to produce a waveform such as illustrated in FIGURE 1B, the information will be misinterpreted to read "0000." It is seen, therefore, that the shifting of the zero crossing caused by a degraded signal will lead to the incorrect recovering of recorded information.

When a pulsed phase modulation recording scheme is used for recording and recovering digital information, the readback signal generally undergoes various degrees of degradation dependent upon various parameters, such as recording current and pulse width, bit density, recording media, media speed variations, write-read head and read amplifier characteristics. Degraded signals are very likely to occur as the speed of the recording medium and the pulse packing density are increased. Zero crossing time shifts therefore become an important factor because the time between significant and non-significant zero crossing diminishes as the pulse packing density increases and it becomes more difficult to logically inhibit the non-significant zero crossings.

Referring to FIGURE 1A, it is noted that a slight dip in the signal occurs at $t_4$. In experimenting with various read back circuitries, it was found that the depth of the dip is related to the amount of distortion in the readout signal. It was found, for example, that the deeper the dip, the less the distortion. Likewise, the less the dip, the greater the distortion. It is noted that the dip referred to relates to the third harmonic of one-half the fundamental frequency. Consequently, it was found that if the depth of the dip could be increased by emphasizing the third harmonic of one-half of the fundamental frequency as found in the readout signal that degradation in the readout signal could be corrected.

Referring particularly to FIGURE 2, an input signal, which may be degraded, such as the type illustrated in FIGURE 1B, is applied to a clipping circuit 10 through a capacitor 12. The clipping circuit 10 includes a bridge network having four diodes connected to suitable plus and minus potentials through resistors 14 and 16. The clipping circuit 10 receives the read back signal, and limits or clips the applied signal to produce a substantially square wave or rectangular shape output signal.

The output signal from the clipping network 10 is applied to the base of a transistor amplifier 18. The output amplified signal from the transistor amplifier 18 is applied to a subsequent amplifier 20. The output of the transistor amplifier 20 is applied to still a third amplifier stage 22.

The various amplifier stages are conventional in design and are associated with various elements and operating voltages to permit them to operate at class A amplifier. Consequently, the output from the amplifier stage 22 will be substantially the same as the input signal to the amplifier 18, except that it will be greatly amplified and inverted in phase. Because the amplifiers are conventional in design and various other types of amplifiers may be used in practicing the invention, a detailed description of the amplifiers involved will not be given.

The output signal from the amplifier stage 22 is applied to a parallel tuned circuit 24 including an inductance 26, a resistor 28 and a capacitor 30. The parallel tuned circuit 24 is tuned to the third harmonic of the basic frequency of the applied signal from the amplifier 22. Since a parallel circuit is involved, it offers a high impedance to the third harmonic frequency signal and relatively low impedance to other frequencies. Consequently, the circuit of FIGURE 2 involves a form of negative feedback. The output signal from the parallel circuit 24 is applied to the emitter of the transistor 18 through a suitable coupling network including a resistor 32 and a capacitor 34.

The fedback signal tends to attenuate the output signal of the transistor amplifier 18 and all frequencies except the third harmonic. This has the overall effect of emphasizing the third harmonic signal applied from the amplifier stage 22 through a coupling transformer 36.

The output signal from the secondary winding of the transformer 36 is applied across a pair of resistors 38 and 40, which is then connected to a clipper circuit 42. The clipper circuit may be similar to the clipping circuit 10. The output signal from the clipper circuit is amplified by an amplifier 44 and then applied to an output transformer 46. The secondary winding of the output transformer 46 may be applied to a zero cross detector circuit which will generate pulse signals in accordance with the zero crossover points of the output signal.

Because of the feedback network from the amplifier 22 to the amplifier 18, the third harmonic signal is emphasized by attenuating frequencies other than the third harmonic. Consequently, the input signals to the amplifier 18 will cause an overall output signal at its collector to have slightly different phase and amplitude. The overall output signal will, by the effects of this circuit, have its zero crossing times changed in such a manner as to reduce distortion.

Referring to FIGURE 3, FIGURE 3A illustrates the type of square wave output signal which a degraded signal would tend to create. The degraded signal causes the zero crossover points to occur at the wrong times. In FIGURE 3*b*, there is illustrated a somewhat similar square wave signal. However, it is noted that the zero crossover points have been changed and are now closer to the times at which the zero crossover points should occur. Consequently, it is seen that the feedback circuit in which the third harmonic signal was emphasized has corrected the input degraded signal.

It is apparent that various other types of circuits may be used to emphasize the third harmonic. For example, various other types of circuits which involve limiting and amplification may be used rather than the amplifier circuit disclosed. Also, passive circuits in which the third harmonic signal is accentuated may be employed rather than the negative feed back network in which all frequencies other than the third harmonic are attenuated.

The present invention has provided a relatively simple and effective means for compensating for degradations in signals read back from a recording medium using pulsed phase modulation.

The embodiments of the invention in which an exclusive property or privilege is claimed are defined as follows:

1. A correction circuit for a signal read back from a recording medium comprising, means for limiting and amplifying said read back signal, a filter network tuned to the third harmonic of one-half of the fundamental frequency of said read back signal, means for applying the limited and amplified read back signal to said filter network, and means for feeding back the output signal from said filter network to said means for limiting and amplifying said read back signal whereby the third harmonic of one-half of said fundamental frequency of said read back signal becomes emphasized in the output signal of said correction circuit.

2. In combination with a recording system for reading back from a recording medium a phase modulated signal of a predetermined frequency, a circuit for correcting degradation in said signal read back from a recording medium comprising limiting means for limiting said phase modulated signal, means for amplifying said limited phase modulated signal, a filter network tuned to the third harmonic of one-half of said predetermined frequency, means for applying the amplified limited signal from said amplifying means to said filter network, and means for combining said phase modulated signal read back from said recording medium after it has been limited with the output signal from said filter network whereby said read back signal is shifted in phase and amplitude to correct for a degradation in said read back signal.

3. In combination with a recording system for reading back from a recording medium a phase modulated signal of a predetermined frequency, a circuit for correcting degradation in said signal comprising a network means for limiting said phase modulated signal, transistor means for amplifying said limited phase modulated signal from said network means, a filter network including a tuned circuit tuned to the third harmonic of one-half of said predetermined frequency, means for applying the amplified limited signal from said amplifying means to said filter network, means for feeding back the signal from said filter network to control the gain of said transistor means so that said third harmonic of one-half of said predetermined frequency, as present in the output signal, is accentuated.

4. In combination with a recording system for reading back from a recording medium a phase modulated signal of a predetermined frequency, a circuit for correcting degradation in said signal comprising a bridge rectifier network means for limiting said phase modulated signal, transistor means for amplifying said limited phase modulated signal from said bridge rectifier network, a filter network including a parallel tuned circuit tuned to the third harmonic of one-half of said predetermined frequency, means for applying the amplified limited signal from said amplifying means to said filter network, means for feeding back the signal from said filter network to bias said transistor means so that said third harmonic of one-half of said predetermined frequency, as present in the output signal, is accentuated, said parallel tuned circuit attenuating the feed back of any third harmonic signal.

5. In combination with a recording system for reading back from a recording medium a phase modulated signal of a predetermined frequency, a circuit for correcting degradation in said signal comprising a bridge rectifier network means for limiting said phase modulated signal, transistor means for amplifying said limited phase modulated signal from said bridge rectifier network, a filter network including a parallel tuned circuit tuned to the third harmonic of one-half of said predetermined frequency, means for applying the amplified limited signal from said amplifying means to said filter network, means for feeding back the signal from said filter network to bias said amplifier means so that said third harmonic of one-half of said predetermined frequency, as present in the output signal, is accentuated, said parallel tuned circuit attentuating the feed back of said third harmonic signal, a limiter circuit, means for applying the output signal with said third harmonic signal accentuated to said limiter circuit, and means for applying the output signal from said limiter circuit to a zero-cross detector circuit.

References Cited

UNITED STATES PATENTS

| | | | |
|---|---|---|---|
| 2,250,598 | 7/1941 | Netteson | 179—171 |
| 2,250,606 | 7/1941 | Von Ingen Schenau | 179—171 |
| 2,256,072 | 9/1941 | Bruck | 179—171 |
| 2,557,154 | 6/1951 | Strandrud | 178—44 |

MALCOLM A. MORRISON, *Primary Examiner.*